United States Patent [19]

Horster

[11] 3,917,832

[45] Nov. 4, 1975

[54] COMPOSITIONS COMPRISING D-THYROXINE AND D-TRIIODOTHYRONINE

[75] Inventor: Franz Adolf Horster, Hilden, Germany

[73] Assignee: Merck Patent Gesellschaft mit beschrankter Haftung, Darmstadt, Germany

[22] Filed: Sept. 24, 1971

[21] Appl. No.: 183,663

[30] Foreign Application Priority Data

May 28, 1971  Germany............................ 2126533

[52] U.S. Cl. ................................................ 424/319
[51] Int. Cl.² .......................................... A61K 27/00
[58] Field of Search ..................................... 424/319

[56] References Cited

UNITED STATES PATENTS

| | | | |
|---|---|---|---|
| 2,925,364 | 2/1960 | Bechtol | 424/319 |
| 3,157,574 | 11/1964 | Heming et al. | 424/319 |

FOREIGN PATENTS OR APPLICATIONS

| | | | |
|---|---|---|---|
| 289 | 1/1960 | France | 424/319 |
| 923,171 | 10/1963 | United Kingdom | 424/319 |
| 680,863 | 2/1964 | Canada | 424/319 |

Primary Examiner—Frederick E. Waddell
Attorney, Agent, or Firm—Millen, Raptes & White

[57] ABSTRACT

Pharmaceutical compositions comprising d-thyroxine and d-triiodothyronine are useful in the treatment of hyperlipidemias, especially hypercholesterolemias and hypertriglyceridemias.

4 Claims, No Drawings

COMPOSITIONS COMPRISING D-THYROXINE AND D-TRIIODOTHYRONINE

BACKGROUND OF THE INVENTION

This invention relates to pharmaceutical preparations useful in the treatment of hyperlipidemias, especially hypercholesterolemias and hypertriglyceridemias.

It is considered a proven fact nowadays that an elevated lipid level in the blood is a main risk factor in the occurrence of angiopathies, especially arteriosclerosis and coronary sclerosis. This is particularly true for cholesterol levels of above 220–300 mg./100 ml. and triglyceride levels of more than 0.5 – 0.75 mM/l. (45-66 mg./100 ml.) in the serum. Lipid-lowering pharmaceuticals are a necessity in order to therapeutically influence the prognosis of hyperlipidemias. Among the substances now available for this purpose is the thyroid gland hormone thyroxine. The hormone is secreted by the human thyroid gland in its L-form; this L-form can be utilized therapeutically: it accelerates numerous metabolic processes of the human organism, inter alia also the fat metabolism. However, the other metabolic effects (heart, circulation, digestion, protein and carbohydrate metabolism) of L-thyroxine surpass the effect on the lipid metabolism, so that L-thyroxine cannot be considered for a specific therapy of angiopathy, especially arteriosclerosis or coronary sclerosis.

However, investigations conducted within the last few years showed that the optical antipode of L-thyroxine, viz., the synthetic D-thyroxine (d-$T_4$, denoted by I hereinbelow) predominantly lowers an elevated lipid level, but the other metabolic effects known for the L-thyroxine are minimal and exert a disturbing influence only at high dosages or when the D-thyroxine is contaminated with L-thyroxine.

Similar relationships exist with the other hormone secreted by the human thyroid gland, viz., L-triiodothyronine. The L-form exhibits marked general metabolic effects whereas the predominant activity of the D-form (called II hereinbelow) is its effect on elevated lipid levels. Depending on the dosage and the degree of purity, side effects also occur in case of II, which correspond to the natural activity of the L-form and are undesirable in the treatment of hyperlipidemias.

Although it is now possible to produce the d-forms of $T_4$ and $T_3$ (I and II, respectively) of a purity of 99 – 99.9%, therapy with d-forms still means that a small proportion of the corresponding L-forms are concomitantly administered, with the resulting wide spectrum of undesired side effects. The necessity thus exists of employing the lowest possible effective dosage of the d-forms to achieve the desired therapeutic effect.

SUMMARY OF THE INVENTION

This invention relates to pharmaceutical compositions comprising d-thyroxine (I) or a physiologically acceptable salt thereof, d-triiodothyronine (II) or a physiologically acceptable salt thereof and at least one solid, liquid, or semiliquid auxiliary agent or vehicle. In a method of use aspect this invention relates to use of these pharmaceutical compositions for the treatment of hyperlipidemias, especially hypercholesterolemias and hypertriglyceridemias.

DETAILED DISCUSSION

It has now been found, surprisingly, that it is possible, in humans, to reduce the total dosage of I and II required to lower the cholesterol and/or lipid levels to the desired levels by administering a combination of I and II.

In this connection, a synergistic effect is involved in a dual sense, viz.,

1. The predominant effect of I is the lowering of elevated cholesterol levels; this effect is enhanced by the addition of II to an extent which markedly exceeds the minor effect exhibited separately by II on lowering cholesterol levels; and
2. The predominant effect of II is the lowering of total lipid and/or triglyceride levels; this effect is amplified by the addition of I, an effect which could not be obtained by the administration of I alone.

Accordingly, the combination of I and II lowers both cholesterol and lipid levels substantially more than the same individual dosages of components I and II.

Clinical studies have established the synergistic effect of the simultaneous administration of combinations of I and II.

It has been found, furthermore, that the combination of I and II shows an anti-exophthalmogenic activity which is stronger than that of its components (synergistic effect). An experimental exophthalmus in goldfish (Carassius auratus) and in guinea pigs provoked by injection of thyreotropin (TSH) could be inhibited by applying the combination. Patients suffering from euthyreot endocrine ophthalmopathy were treated daily with a combination of 1 mg. of I and 0.25 mg. of II; they showed a measurable decrease of the endocrine eye symptoms (exophthalmos, lid edema, paralysis of the eye muscles).

Normally, compounds I and II are employed in the compositions of this invention as their sodium salts. However, it is, of course, also possible to employ, in place of the sodium salts, other physiologically acceptable salts, e.g., other alkali metal salts, alkaline earth metal salts, ammonium salts and substituted ammonium salts. Specific examples are the potassium, lithium, calcium, aluminum and iron salts. Preferred substituted ammonium salts are those derived, for example, from lower mono-, di-, or trialkylamines, or mono-, di- and trialkanolamines. The free amino acids per se can also be used.

Compounds I and II can be present in the preparations to be produced according to this invention in any desired ratio, e.g., in a weight ratio of between 1 : 1 and 10 : 1, preferably 3 : 1 to 5 : 1, especially about 4 : 1. The preparations are preferably administered in unit dosages containing 0.2 – 4 mg., preferably 0.5 – 2 mg., of compound I and 0.05 – 1 mg., preferably 0.1 – 0.5 mg., of compound II. The total content of I in the unit dosage forms range preferably between about 0.01 and 1%, especially between 0.05 and 0.5%, by weight, and the total content of II preferably is between 0.002 and 0.2, especially 0.01 and 0.1%, by weight.

The preparations obtainable according to this invention can be employed, in particular, both in the human and veterinary medicines. They are suitable for the prophylaxis and treatment of all secondary forms of hypercholesterolemia and hypertriglyceridemia, especially in conjunction with the therapy of the basic disease, e.g., diabetes, chronic pancreatitis and liver diseases. Furthermore, the preparations of this invention are suitable for the treatment of all hyperlipoproteinemias, for example the essential hypercholesterolemia, mixed types of hypercholesterolemia and hypertriglyceridemia, carbohydrate-induced hyperlipidemia and calorie-induced hyperlipidemia.

The preparations of this invention are preferably administered enterally, especially orally. Suitable for enteral application are, in particular, tablets, dragees, or capsules, and furthermore also, for example, syrups or elixirs. Suitable carrier substances are organic or inorganic compounds suitable for the intended application and which do not react with the effective agents, such as, for instance, water, ethanol, benzyl alcohol, polyethylene glycols, gelatin, lactose, amylose, magnesium stearate, talc, cellulose and the derivatives thereof, silicic acid. The preparations can, if necessary, be sterilized and/or mixed with auxiliary agents, such as lubricants, preservatives, stabilizers, or wetting agents, emulsifiers, salts for influencing the osmotic pressure, buffers, coloring, flavoring and/or aromatous substances.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Tablets:

A mixture of 100 g. of the sodium salt of d-thyroxine (I) and 25 g. of the sodium salt of d-triiodothyronine (II) is applied, in the form of a solution in methanol, to 8.275 kg. of lactose. The solvent is evaporated under reduced pressure at 40° C. and the thus-obtained powder is mixed with 0.1 kg. of magnesium stearate, 0.3 kg. of finely divided silicic acid, 0.6 kg. of cellulose powder, 0.1 kg. of sodium carboxymethylcellulose and 0.5 kg. of potato starch. Then, the mixture is made into tablets of respectively 100 mg. each in a conventional manner. Each tablet contains 1 mg. of I (sodium salt) and 0.25 mg. of II (sodium salt).

EXAMPLE 2

Tablets:

The procedure of Example 1 is followed, so that tablets of the following composition are obtained:

| | |
|---|---|
| Sodium salt of d-thyroxine | 0.2 mg. |
| Sodium salt of d-triiodothyronine | 0.05 mg. |
| Lactose | 75 mg. |
| Corn starch | 23.75 mg. |
| Calcium stearate | 1 mg. |

EXAMPLE 3

Tablets:

The procedure of Example 1 is followed, so that tablets are obtained having the following composition:

| | |
|---|---|
| Sodium salt of d-thyroxine | 2 mg. |
| Sodium salt of d-triiodothyronine | 0.2 mg. |
| Lactose | 80 mg. |
| Potato starch | 15.8 mg. |
| Talc | 2 mg. |

EXAMPLE 4

Tablets:

The procedure is followed as set out in Example 1, so that tablets are obtained having the following composition:

| | |
|---|---|
| Sodium salt of d-thyroxine | 1 mg. |
| Sodium salt of d-triiodothyronine | 1. mg. |
| Lactose | 86 mg. |
| Wheat starch | 40 mg. |
| Arrowroot | 18 mg. |
| Magnesium stearate | 2 mg. |
| Talc | 2 mg. |

EXAMPLE 5

Dragees:

Dragee cores obtainable, for example, according to one of Examples 1 through 4, are coated with a customary dragee skin of sugar, corn starch, talc, and tragacanth, in such a manner that each dragee contains a dragee coating of a weight of 150 mg.

EXAMPLE 6

Capsules:

A mixture, consisting of 400 g. of the sodium salt of d-thyroxine and 40 g. of the sodium salt of d-triiodothyronine is applied, in the form of a solution in ethanol, to 9 kg. of lactose. The solvent is removed by evaporation under reduced pressure at 40° C., the thus-obtained powder is mixed with 360 g. of talc, 100 g. of finely divided silicic acid, and 100 g. of magnesium stearate, and filled into hard gelatin capsules in the usual manner, so that each capsule contains 4 mg. of I (sodium salt) and 0.4 mg. of II (sodium salt).

It is, of course, also possible according to this invention to administer I and II simultaneously, but in the form of individual dosage units, as demonstrated by the following example.

EXAMPLE 7

Tablets:

The procedure analogously to Example 1 is conducted, so that tablets of the following compositions are obtained:

| | | | |
|---|---|---|---|
| (a) | Sodium salt of d-thyroxine | 1 | mg. |
| | Lactose | 83 | mg. |
| | Magnesium stearate | 1 | mg. |
| | Finely divided silicic acid | 3 | mg. |
| | Cellulose powder | 6 | mg. |
| | Sodium carboxymethylcellulose | 1 | mg. |
| | Potato starch | 5 | mg. |
| (b) | Sodium salt of d-triiodothyronine | 0.25 | mg. |
| | Lactose | 83.75 | mg. |
| | Magnesium stearate | 1 | mg. |
| | Finely divided silicic acid | 3 | mg. |
| | Cellulose powder | 6 | mg. |
| | Sodium carboxymethylcellulose | 1 | mg. |
| | Potato starch | 5 | mg. |

In each case, a tablet of composition (a) and a tablet of composition (b) are simultaneously administered.

EXAMPLE 8

Administration for eight weeks of 2 mg. of I (in the form of the sodium salt) per day to a 65-year-old female patient resulted in a reduction of the cholesterol level of from 313 to 273 mg.% and a reduction of the total lipid level of from 1012 to 910 mg.%. A subsequent daily administration of 0.5 mg. of II (in the form of the sodium salt) for 4 weeks left the cholesterol level substantially unchanged (280 mg.%), whereas the total lipid level was reduced to 819 mg.%. Subsequent daily administration of a 4 : 1 by weight combination of only half of each of these compounds, viz., 1 mg. of I and 0.25 mg. of II (in the form of their sodium salts, this specific combination being denoted by III hereinbelow), e.g., in a composition of the type described in Example 1, resulted in a further lowering of the serum cholesterol level to 200 mg.% and of the serum lipid level to 790 mg.%.

In a 72-year-old female patient, the cholesterol level was lowered, by an 8 week administration daily of 2 mg. of I, from 387 to 341 mg.%, and the total lipid level was lowered from 1020 to 970 mg.%. Administration of 0.25 mg. of II per day for another 4 week period resulted in practically no change in these levels (352 and 969 mg.%, respectively). Subsequent daily administration of III for 8 weeks reduced the cholesterol level to 310, and total lipid level to 782 mg.%. Control experiments demonstrate that a prolonged administration of I or II, respectively, by itself in physiologically tolerable dosages does not yield any further reduction in the cholesterol and/or lipid levels. Instead, stable values are obtained which are not reduced in the ensuing procedure. Only administration of II results in a further reduction in the cholesterol and/or total lipid levels.

Other combinations of I and II in other quantitative ratios, e.g., 1 : 1 to 10 : 1, preferably 3 : 1 to 5 : 1, are effective at below the effective dosage limits of the two compounds separately.

In the manner of Example 8, I and II in separate pharmaceutically acceptable carriers can be administered in the form of a layered tablet, a pill or micropills containing II in a capsule containing I or discrete particles of I and II and their respective carriers suspended in a matrix containing communication from the exterior to the particles in the interior thereof.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A pharmaceutical composition useful for the treatment of hyperlipidemia comprising, per unit dosage, 0.2 – 4 mg. of d-thyroxine or a physiologically acceptable salt thereof and 0.05 – 1 mg. of d-triiodothyronine or a physiologically acceptable salt thereof, in a weight ratio of the former to the latter of about 4:1, and at least one solid, liquid or semi-liquid pharmaceutically acceptable carrier.

2. The composition of claim 1 adapted for oral ingestion containing, per unit dosage, 0.5 – 2 mg. of d-thyroxine or a physiologically acceptable salt thereof and 0.1 – 0.5 mg. of d-triiodothyronine or a physiologically acceptable salt thereof.

3. A method for the treatment of hyperlipidemia in a living being which comprises administering thereto a composition according to claim 1 in a daily dosage of 0.2 – 4 mg. of said d-thyroxine or a physiologically acceptable salt thereof and 0.05 – 1 mg. of said d-triiodothyronine or a physiologically acceptable salt thereof over a period of at least several weeks to lower both blood cholesterol and lipid levels.

4. A method according to claim 3 wherein the sodium salt of d-thyroxine and the sodium salt of d-triiodothyronine are administered to a living human being.

* * * * *